(12) United States Patent
McDevitt et al.

(10) Patent No.: US 10,445,777 B2
(45) Date of Patent: Oct. 15, 2019

(54) METHODS AND SYSTEMS FOR DELIVERING ELECTRONIC CONTENT TO USERS IN POPULATION BASED GEOGRAPHIC ZONES

(71) Applicant: Verizon Patent and Licensing Inc., Basking Ridge, NJ (US)

(72) Inventors: Patrick McDevitt, Hanover, NH (US); Joseph Hughes, Lancaster, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/066,387

(22) Filed: Oct. 29, 2013

(65) Prior Publication Data
US 2015/0120455 A1 Apr. 30, 2015

(51) Int. Cl.
*G06Q 30/02* (2012.01)

(52) U.S. Cl.
CPC ..... *G06Q 30/0261* (2013.01); *G06Q 30/0244* (2013.01)

(58) Field of Classification Search
None
See application file for complete search history.

(56) References Cited

U.S. PATENT DOCUMENTS

| 9,349,128 | B1* | 5/2016 | Kerr | G06Q 30/0261 |
| 2002/0019699 | A1 | 2/2002 | McCarty et al. | |
| 2003/0033247 | A1 | 2/2003 | McCrossin et al. | |
| 2005/0187972 | A1 | 8/2005 | Kruger et al. | |
| 2006/0200305 | A1* | 9/2006 | Sheha | G01C 21/20 |
| | | | | 701/420 |
| 2006/0270421 | A1* | 11/2006 | Phillips | G08B 21/0236 |
| | | | | 455/457 |
| 2008/0288976 | A1* | 11/2008 | Carson | G06Q 30/0241 |
| | | | | 725/34 |
| 2009/0006145 | A1* | 1/2009 | Duggal | G06Q 30/02 |
| | | | | 705/6 |
| 2009/0070196 | A1* | 3/2009 | Shaffer et al. | 705/10 |

(Continued)

OTHER PUBLICATIONS

Search Report and Written Opinion dated Jun. 9, 2015, in corresponding International PCT Application No. PCT/US14/62583, filed on Oct. 28, 2014 (10 pages).

*Primary Examiner* — Michael W Schmucker
*Assistant Examiner* — Bion A Shelden

(57) ABSTRACT

Systems and methods are disclosed for electronic distribution of electronic content. The method may include receiving, from an advertiser or content provider, a request to transmit electronic content to a plurality of electronic devices of a desired subset of individuals. The electronic content may relate to a target location affiliated with the advertiser or content provider. The method also may include retrieving population density data for the target location and surrounding area, and correlating the subset of individuals with the population density. In addition, the method also may identifying a geographical zone extending from the target location to a perimeter location. The zone may have a size based on the population density correlated with the subset of individuals. The method may further include receiving an indication that the electronic device of a user has entered the geographical zone, and transmitting electronic content to the electronic device of the user.

21 Claims, 6 Drawing Sheets

(56) References Cited

U.S. PATENT DOCUMENTS

| | | | |
|---|---|---|---|
| 2010/0042940 A1* | 2/2010 | Monday | G06F 3/0486 715/764 |
| 2010/0262449 A1 | 10/2010 | Monteforte et al. | |
| 2010/0293218 A1* | 11/2010 | Zhang | G06Q 30/02 709/202 |
| 2012/0036034 A1 | 2/2012 | Golden et al. | |
| 2012/0041816 A1* | 2/2012 | Buchalter | G06Q 30/02 705/14.41 |
| 2012/0225672 A1* | 9/2012 | Tholkes et al. | 455/456.3 |
| 2012/0310713 A1* | 12/2012 | Mercuri | G06Q 30/0201 705/14.1 |
| 2013/0103307 A1* | 4/2013 | Sartipi et al. | 701/465 |
| 2014/0155094 A1* | 6/2014 | Zises | H04W 4/206 455/456.3 |
| 2014/0164118 A1* | 6/2014 | Polachi | 705/14.57 |
| 2014/0279011 A1* | 9/2014 | McMullen | G06Q 30/0261 705/14.58 |
| 2014/0337123 A1* | 11/2014 | Nuernberg et al. | 705/14.45 |

\* cited by examiner

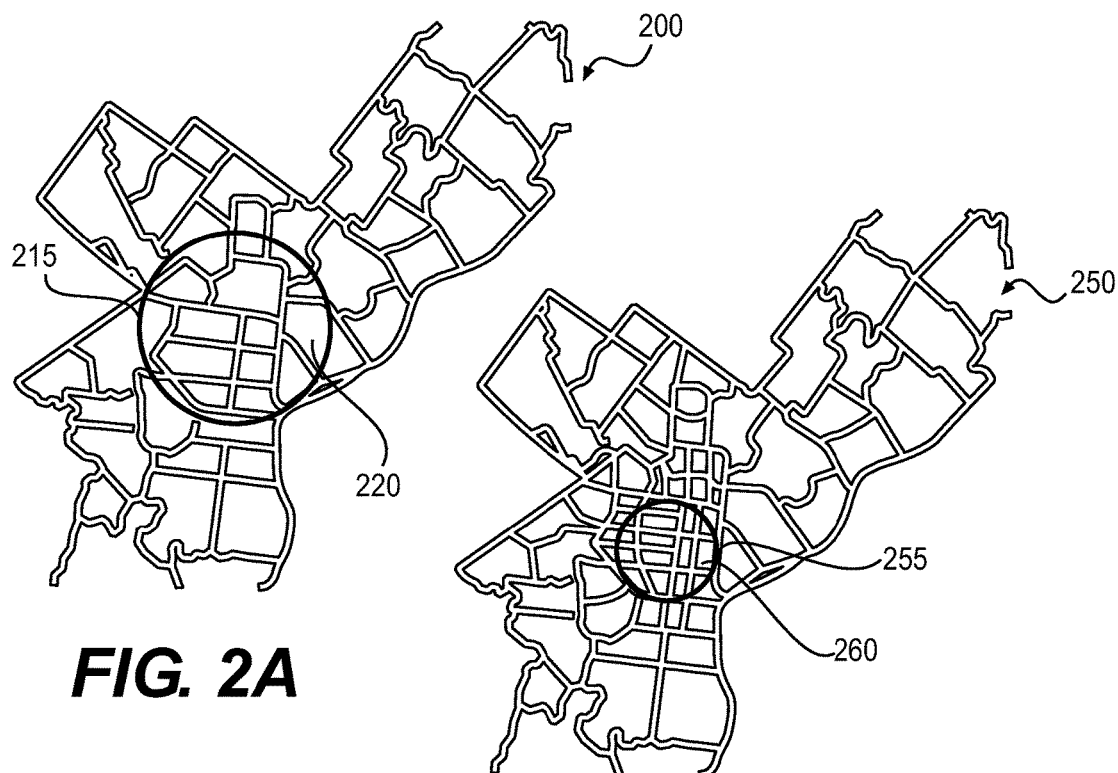
FIG. 2A
FIG. 2B
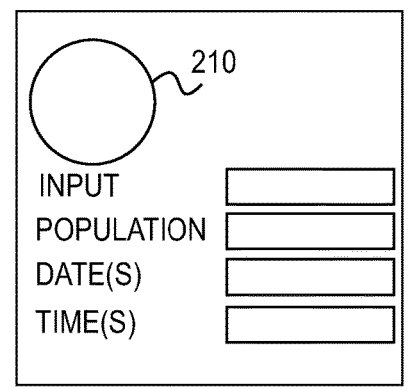

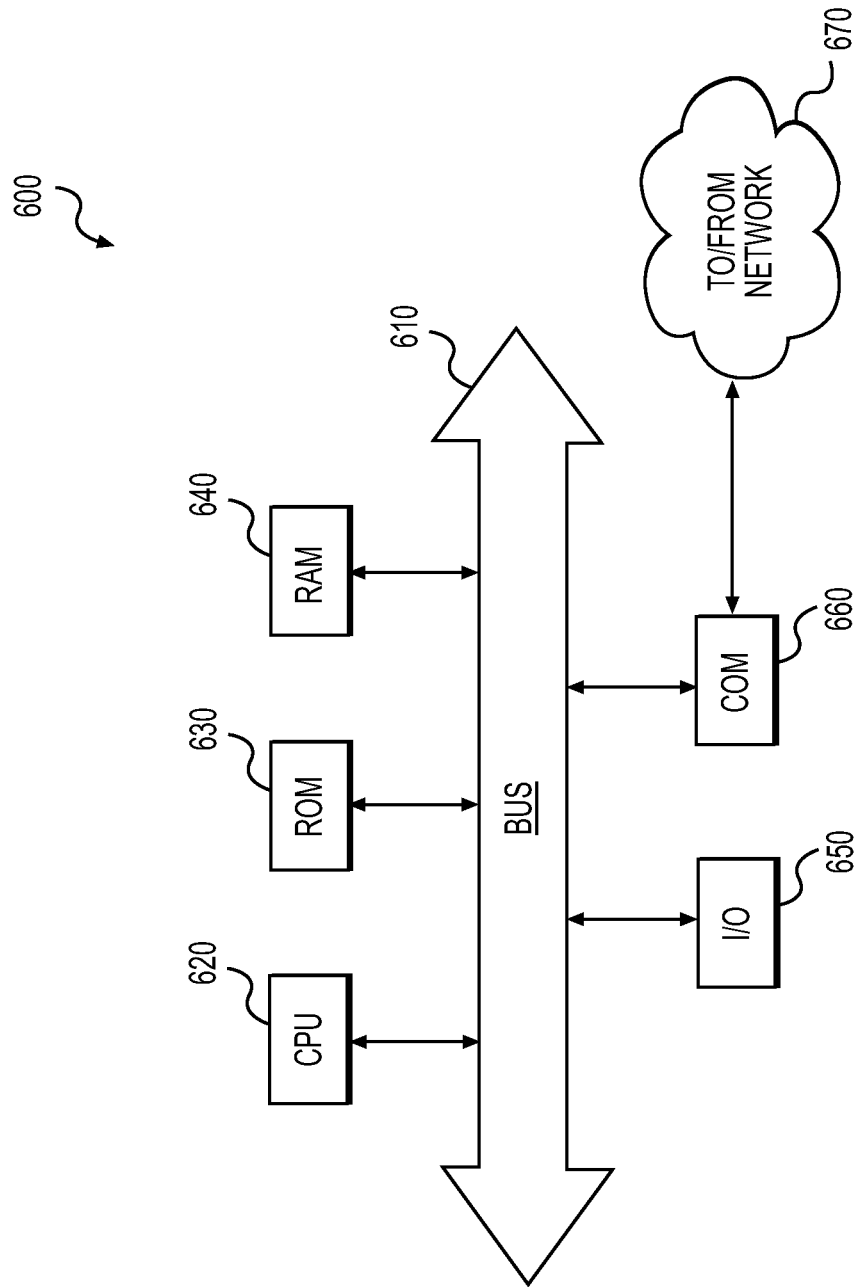

METHODS AND SYSTEMS FOR DELIVERING ELECTRONIC CONTENT TO USERS IN POPULATION BASED GEOGRAPHIC ZONES

TECHNICAL FIELD

Various embodiments of the present disclosure relate generally to providing electronic content based on geographical mapping information. More specifically, exemplary embodiments of the present disclosure relate to systems and methods for providing targeted electronic content to users in a geographic region based on the number of users in the geographic region.

BACKGROUND

Electronic content providers, such as advertisers and content publishers, have been using various methods to send electronic content to users. Such conventional methods include sending email messages, presenting banner ads on websites, sending text messages, presenting pop-up ads, placing ads in online search results, etc. These content providers have found that users are more likely to view and act on content (e.g., redeem a coupon, click on an ad, etc.) if the content is relevant to them. Therefore, increasingly, content providers have been using content targeting methods based on various attributes of a user. For example, content providers target users based on a user's web browsing history, etc.

Some online content providers, such as advertisers and content publishers, have been sending targeted content to users' electronic devices based on the physical location of the user by analyzing the IP address and other user information (e.g., search history, cookies, etc.) transmitted or retrievable from a user's electronic device. For example, many online advertisers and publishers deliver electronic content (such as ads and multimedia) to users' devices based on IP address-based inferences of each user's general location, i.e., which city or country they are predicted to be in. However, such methods are coarse, in that they do not target content based on information more granular than the general area where the user is located. Such methods are also susceptible to location misdirection based on user tools such as virtual environments or desktops, and IP address detection blocking. As a result, other methods for geographically targeted ads and content have been developed based on more granular levels of targeting. For example, businesses may "push" ads and/or content to users' devices when the user enters and connects to a Wi-Fi and/or Bluetooth network operated by the business. However, such methods are quite limited by the relatively short reach of the wireless network employed. Such methods are unable to reach a sufficiently large local audience that is within a desired area for making a decision to patronize the business.

Other online content providers target users within a predetermined geographic zone so that users within the zone receive the targeted content. For example, some online content providers detect the presence of an electronic device user within a certain radius of a target location, and then send the user an ad. These radius or other geographic based methods of providing electronic content may be arbitrary and may not account for variations within different geographic regions. This may result in the electronic content being provided to too few or to too many users.

These predetermined geographic zones, commonly referred to as geo-fences or geofences, are digital, virtual boundaries having a predetermined size. Electronic content providers, such as national advertisers, often approach geographic targeting by constructing the same size radius geo-fence around each of their properties (e.g., a 2-mile radius around every store). While this is simple for the advertiser, it fails to take into account population density and therefore leads to both false negatives and false positives. For example, a one-mile radius around a store in Manhattan, might include 14 ZIP codes, while a one-mile radius around a store in rural Pennsylvania might only include one ZIP code. The number of users reached by the electronic content would be high in Manhattan but conversion rates would likely be low—while the reach might be far too low in Pennsylvania. Conversion rates are based on the number of users acting on the content or ad. For example, if 10,000 users are provided an electronic coupon for a car wash and 3,000 of those users actually redeem the coupon, the conversion rate may be 0.3.

Therefore, there is a tradeoff between the size of a geo-fence and the conversion of consumer behavior: the larger the geo-fence, the more users will receive the electronic content (e.g. an electronic coupon), but the conversion rate may be low. Conversely, the smaller the geo-fence, the fewer users will receive the electronic content, but there may be a high conversion rate. Advertisers attempt to manually optimize the breadth of the geo-fence and the resulting conversion rate but existing methods are too static and unintelligent to enable this.

Accordingly, a need exists for methods and systems of providing improved dynamic targeting of electronic content based on other factors, for example, the population density of a geographic region to obtain reach equivalency of electronic content.

SUMMARY

According to certain embodiments, systems and methods are disclosed for executing electronic distribution of content to electronic device users. One method may include, receiving, from an advertiser or content provider, a request to transmit electronic content to a plurality of electronic devices of a desired subset of individuals. The electronic content may relate to a target location that may be affiliated with the advertiser or content provider. The method also may include steps of retrieving population density data for the target location and surrounding area, and correlating the subset of individuals with the population density, and identifying a geographical zone extending between the target location and a perimeter. The geographical zone may have a size based on the population density correlated with the subset of individuals. The method also may include a step of receiving an indication that one of the plurality of electronic devices of one of the subset of individuals has entered the geographical zone, and transmitting electronic content to the electronic device of the one of the subset of individuals, where the electronic content may relate to the target location. The travel perimeter location may be at the at least one threshold travel parameter. In addition, the method may include generating a zone extending from the perimeter location to the target location. The method also may include receiving an indication that one of the plurality of electronic devices of one of the users has entered the zone, and transmitting electronic content to the electronic device of the user, the electronic content relating to the target location.

The disclosed embodiments may include one or more of the following steps and/or features: the population density data may be based on zip code information, the population density data may be based on zip code plus four information, the method additionally may include steps of retrieving from a database, an inventory of centerpoints representing geographical centers of the zip code plus four geographical zones, overlaying the centerpoints with geographical data, and calculating the number of centerpoints within a geographical region, the population density data may be based on a density of Wi-Fi hotspots, the zone may be circular, the zone may be a polygon, the request may further include a parameter based on a date, the request may further include a parameter based on a time period, the method also may include a step of adjusting the zone based on an additional parameter, the additional parameter may be selected from the group consisting of date, time, and traffic data, the step of generating the zone may further include adjusting the zone based on geographic data, the geographic data may be selected from the group consisting of natural boundaries, highway accessibility, and geographic borders.

According to certain embodiments, systems are disclosed for managing an electronic distribution of content to electronic device users. One system includes a data storage device storing instructions for managing the electronic distribution of content to electronic device users, a processor configured to execute the instructions to perform a method. The method may include receiving, from an advertiser or content provider, a request to transmit electronic to a plurality of electronic devices of a desired subset of individuals. The electronic content may relate to a target location that may be affiliated with the advertiser or content provider. The method also may include the steps of retrieving population density data for the target location and surrounding area, and correlating the subset of individuals with the population density, and identifying a geographical zone extending between the target location and a perimeter. The geographical zone may have a size based on the population density correlated with the subset of individuals. The method also may include a step of receiving an indication that one of the plurality of electronic devices of one of the subset of individuals has entered the geographical zone, and transmitting electronic content to the electronic device of the one of the subset of individuals and the electronic content may relate to the target location. The travel perimeter location may be at the at least one threshold travel parameter. In addition, the method may include generating a zone extending from the perimeter location to the target location. The method also may include receiving an indication that one of the plurality of electronic devices of one of the users has entered the zone, and transmitting electronic content to the electronic device of the user, the electronic content relating to the target location.

According to certain embodiments, a computer-readable medium is disclosed that, when executed by a computer system, causes the computer system to perform a method for managing an electronic distribution of content to electronic device users, receiving, from a content provider, a request to publish electronic content on a plurality of electronic devices of a number users. The electronic content may relate to a target location. The method also may include the steps of receiving, from an advertiser or content provider, a request to transmit electronic to a plurality of electronic devices of a desired subset of individuals. The electronic content may relate to a target location that may be affiliated with the advertiser or content provider. The method also may include the steps of retrieving population density data for the target location and surrounding area, and correlating the subset of individuals with the population density, and identifying a geographical zone extending between the target location and a perimeter. The geographical zone may have a size based on the population density correlated with the subset of individuals. The method also may include a step of receiving an indication that one of the plurality of electronic devices of one of the subset of individuals has entered the geographical zone, and transmitting electronic content to the electronic device of the one of the subset of individuals, where the electronic content may relate to the target location. The travel perimeter location may be at the at least one threshold travel parameter. In addition, the method may include generating a zone extending from the perimeter location to the target location. The method also may include receiving an indication that one of the plurality of electronic devices of one of the users has entered the zone, and transmitting electronic content to the electronic device of the user, the electronic content relating to the target location.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A and 2B are illustrations of an electronic map having population-based geographic zones, according to another exemplary embodiment of the present disclosure.

FIG. 6 is a simplified functional block diagram of a computer configured as a host server, for example, to function as a reach server, according to exemplary embodiments of the present disclosure.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems of presenting electronic content to a target reach population (i.e., number, value, or identities of users) based on the geographic location of users. As used herein, the term "reach" refers to the number of users of electronic devices an electronic content provider wishes to receive its electronic content (e.g. 50, 500, 50,000 users, etc.). The present disclosure may be used for any target location having any suitable scale. Specifically, the present disclosure describes methods and systems for generating a geographic zone based on the reach value and presenting electronic content targeted to users within the geographic zone. In some embodiments, methods and systems are disclosed for generating a geographic zone, referred to as geo-fence, based on the reach value for targeting users and presenting electronic content to users detected within the geo-fence. In some embodiments, population is used as a proxy for the reach value, and various proxies are used for population (e.g. zip codes, election districts, Wi-Fi hotspots, department of motor vehicle locations, coffee shops, gas stations, telephone area codes, schools, restaurants, hotels, libraries, police stations, etc.) For purposes of illustration, if a content publisher sends a request to a reach server indicating a desire to reach 100,000 users within a target area (i.e., 100,000 reach), one or more servers may generate a geo-fence extending from the target location to a perimeter location such that the perimeter of the geo-fence encompasses (and the area of the geo-fence overlays) a population correlated with the reach value. Content is then selectively presented to users detected be within the geo-fence.

In still further embodiments, methods and systems are disclosed for dynamically adjusting a geo-fence based on date, time, event, feedback (e.g. assessment that too many or too few users are viewing, converting, and/or activating, etc.) For purposes of illustration, a content provider may send a request to a reach server identifying a reach value of 250 new users per hour between 8:00 AM and 6:30 PM in a target geographic region. The reach server or any other server in communication with the reach server may determine the population density of the geographic region at different times during the day and adjust the size or other geometry geo-fence so that the content is presented to 250 new users per hour throughout the requested time range.

Figure 1:
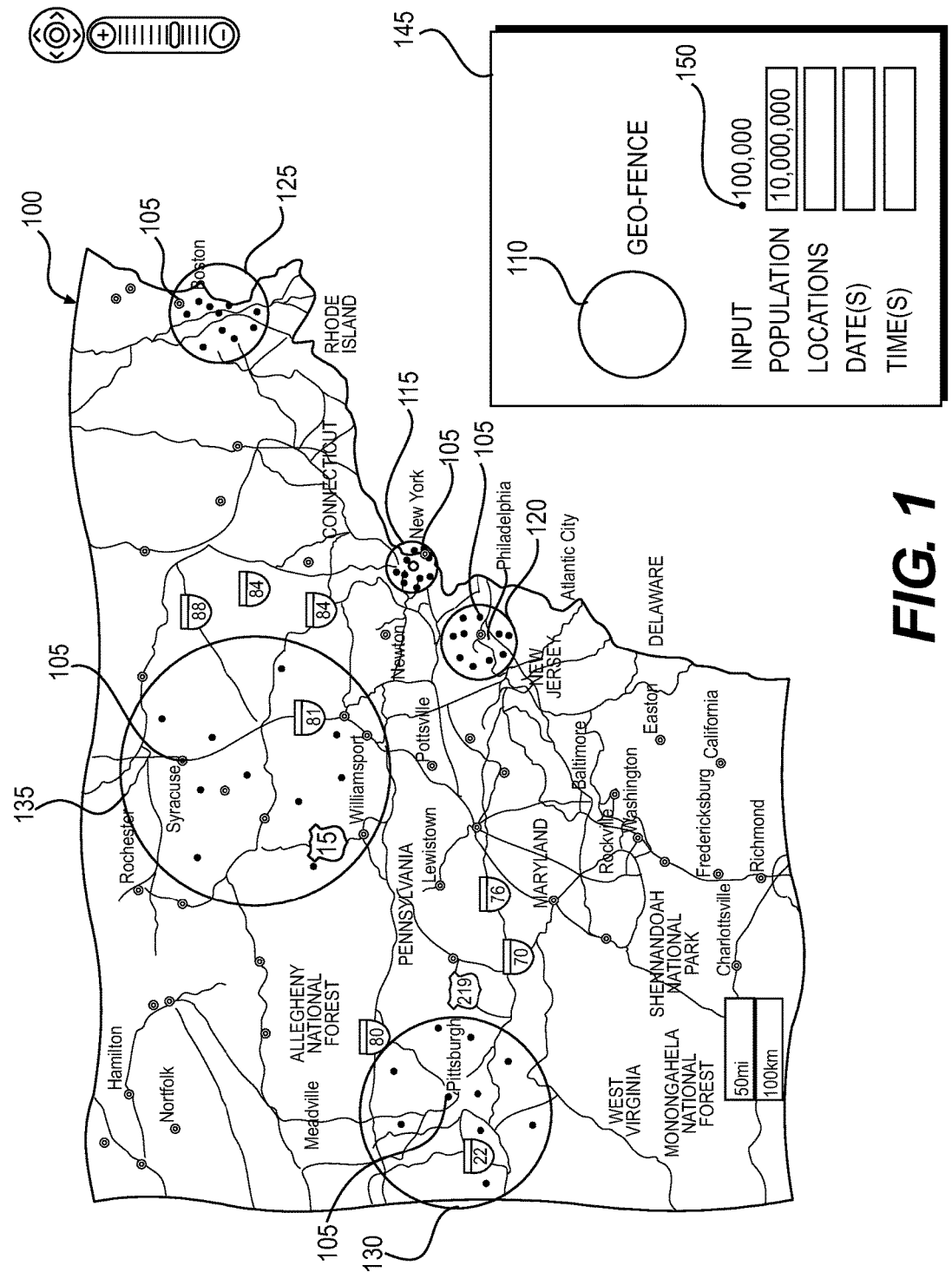
FIG. 1 is an illustration of an electronic map having multiple population-based geographic zones, according to an exemplary embodiment of the present disclosure.

FIG. 1 is an illustration of an electronic map 100 including multiple geo-fences 115, 120, 125, 130, and 135 (collectively referred as geo-fences 110) around target locations 105. As used herein, the term "geo-fence" generally refers to a virtual geographic zone having a perimeter and an area within the perimeter. The geo-fence may not be visible to a user of viewing an electronic map, but for illustrative purposes, FIG. 1 depicts geo-fences 110 superimposed over the electronic map.

The target location 105 may be defined by any type or combination of GPS coordinates, address, road intersection, building, business, POI, venue, public space, or any other location of interest. Although shown as a circle in FIG. 1, each geo-fence 110 may have any suitable size and shape and may be positioned at, or any suitable distance from, the target location 105. In one embodiment, each geo-fence 110 may be centered around the target location 105, such as a city center, but may be positioned around any location, and be of any scale (e.g. building, block, neighborhood, campus, county, state, etc.) In another embodiment, each geo-fence 110 may be centered at a location selected near the target location 105 such as an associated intersection, highway, POI, etc. In yet another embodiment, the geo-fence 110 may be centered at any other point or related point within some predetermined distance from the target location 105. As will be discussed in detail below, each geo-fence 110 may be generated according to parameters provided by one or more advertisers or electronic content providers and used to target users within the area defined by each geo-fence 110 with relevant electronic content. In one embodiment, each geo-fence 110 may be generated according to instructions received from an owner, operator, or other affiliate of the target location 105. Alternatively or additionally, the geo-fence may be generated according to parameters defined by an advertising network, mapping service, and/or geo-fencing service provider.

In one embodiment, geo-fence 110 may be associated with one or more population markers 150, each having a pre-selected value or number of people, which in some embodiments may be inputted in an input field 145 by the content provider. For example, as shown in FIG. 1, for purposes of illustrating a disclosed reach equivalent concept, one geo-fence 115 may be positioned around New York City, another geo-fence 120 may be positioned around Philadelphia, another geo-fence 125 may be positioned around Boston, another geo-fence 130 may be positioned around Pittsburgh, and another geo-fence 135 may be positioned around Syracuse. Each geo-fence 110 may have a different size, but may include approximately the same population (e.g. 10,000,000 designated by ten markers 150, of 100,000 each), such that the size of each geo-fence 110 may be based on population density. As shown in FIG. 1, geo-fence 115 around New York City is smaller in size than the geo-fence 120 around Philadelphia as the population density of New York City may be higher than the population density around Philadelphia. Of course, the scale of geo-fences 110 around locations 105 may be significantly smaller than at the city-level described for purposes of example. For example, geo-fences 110 may be targeted around much smaller areas, such as neighborhoods, campuses, buildings, etc.

Each geo-fence 110 may have the same or different shapes, which may be any suitable shape, such as a circle, polygon, or any other regular or irregular shape. The markers 150 are shown in FIG. 1 for illustrative purposes to show that various geographic areas may have varied population densities. The target location(s) 105 may be any location, such as a store, restaurant, gas station, etc. The geo-fences 110 may be used by owners of one or more locations, such as location 105, to present users within the geo-fence 110 with electronic content related to the location. For example, an owner of retail stores at locations 105 may use geo-fences 110 to identify a certain reach value within a certain distance from each location and send electronic content to users within the geo-fences 110 via one or more servers over a network.

FIG. 2A is an illustration of an electronic map 200 including a geo-fence 215 around discrete geographic areas 220, having known populations, such as zip codes. FIG. 2B is an illustration of an electronic map 250 including a geo-fence 255 around smaller discrete geographic areas 260 having known populations, such as "zip plus 4" areas. The geo-fences may have any suitable size, shape, or geometry. The discrete geographic areas 220 and 260 may be saved in a database, such as on a population proxy server and may be periodically updated. For example, the database may be updated based on census data for each geographic area 220 and 260 and/or based on any changes in the geographic areas. The geo-fences 215 and 255 may be configured to cover each of the discrete areas 220 and 260. In this manner, by using the discrete areas 220 and 260 each having a known population size, the process of generating each geo-fence may be simplified. Although zip codes and zip plus 4 areas are used as examples with reference to the discrete geographic areas 220 and 260 shown in FIGS. 2A and 2B, the discrete geographic areas 220 and 260 having known populations may be any size (e.g. larger or smaller). In addition, the size and shape of the discrete geographic areas 220 and 260 may change based on the time of day, date, event, and/or any other factors or combination of factors. According to certain embodiments, the discrete geographical areas 220, 260 may be used to generate a special inventory of zip codes and municipality or county regions or polygons. Each zip code, zip plus 4, or other municipality or region may have a centroid defining a center point of the area. The regions and centroids may be constantly updated as populations move and change. The presence of centroids in any given area may provide insights into the population density of any given area. For example, geo-fences 215 and 255 may be generated so as to include any predetermined number of zip centroids, zip plus 4 centroids, or any other municipality/region centroids.

Figure 3:
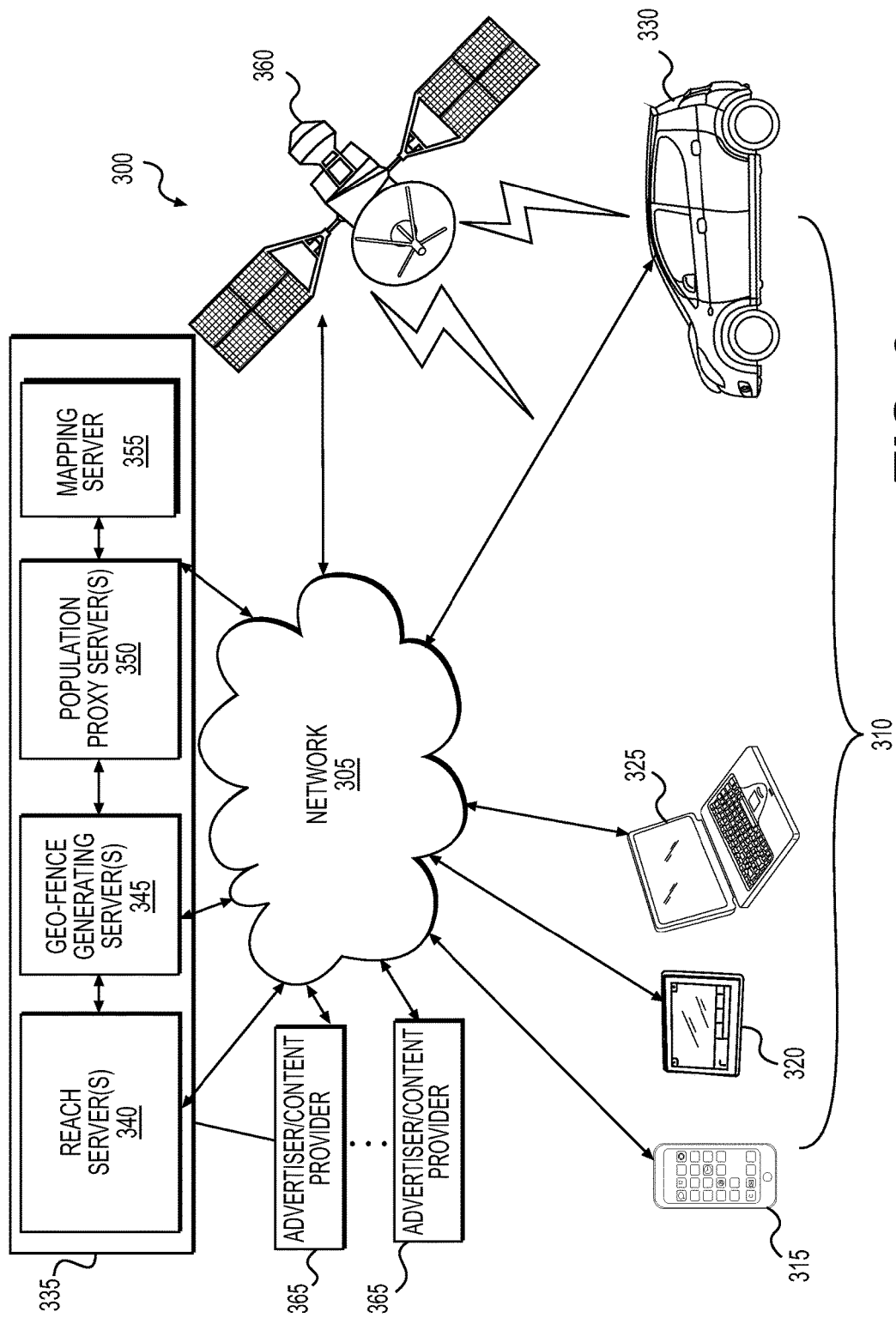
FIG. 3 is a block diagram of a communications environment and systems configured to generate and display electronic content based on population-based geographic zones displayed on an electronic map.

FIG. 3 is an illustration of an exemplary environment 300 in which content may be presented to a user's electronic device 310 connected to, or capable of connecting to a network 305, such as the Internet, based on the user's presence in population based geographic zones. Examples of such an electronic device 310 may include mobile phones 315, in car or portable GPS devices 320 and 330, computers 325 (e.g. desktops, laptops, and tablets, etc.) smart watches, etc. The electronic device 310 may automatically send and receive electronic location information via the network 305, one or more satellites 360, and/or via other suitable manner. The electronic device 310 also may communicate with a system of servers 335 via the network 305. The system of servers 335 may include one or more servers, such as reach server(s) 340, geo-fence generating server(s) 345, population proxy server(s) 350 and/or mapping server(s) 355 in communication with each other. In addition, the system 300 may include one or more advertiser/content providers 365 in communication with the server system 335. Examples of content providers may include advertisers, businesses, retailers, agents, organizations, publishers, news agencies, government agencies, etc.

The reach server 340 may include a database of parameters received from one or more of the advertiser/content providers 365 for sending content to users within a geo-fence. Such parameters may include parameters related to the geo-fence, such as the reach value to which content should be presented, dates (e.g., weekday, weekend, holiday, season), times (e.g., morning, midday, afternoon, evening, night), traffic (e.g., rush-hour, non-rush-hour), events (e.g., New Year's Eve, Marathon, Super Bowl, Thanksgiving), as well as demographic characteristics of users, and/or any other suitable parameters, or combination of parameters. Examples of additional parameters related to the geo-fence may include a travel distance and/or time from the target location, travel direction, travel speed, type of route (e.g., highway, tollway, road, local road, etc.), geographic borders, natural borders (e.g., mountains, rivers, lakes, etc.) Examples of parameters related to the demographic information of a user may include vehicle type, average speed of the user, past online search history, age, gender, income, vehicles (cars v. bicycles v. walking, etc.) driving habits, etc. Examples of other information or content parameters the reach server 340 may receive from one or more advertiser/content providers 365 may include weather conditions, news event (e.g. elections), etc. Of course, it should be appreciated that any type of business or entity might target geo-fences to any combination of parameters with any relevant electronic content and/or ads.

For example, a regional or national furniture store may wish to send an electronic ad and coupon to 100,000 users around each of its stores on the day before Presidents' Day. The parameters sent by the advertiser/content provider(s) 365 may be received and processed by the reach server 340 and one or more geo-fence generating servers 345 may retrieve population data from the population proxy server(s) 340 and mapping server(s) 355 to generate geo-fences 110 around a population correlated to a reach value of 100,000 users and send the 100,000 users within the geo-fences 110 the electronic ad and coupon.

The geo-fence generating server(s) 345 may generate one or more virtual electronic geo-fences 110 based on the parameters received by the reach server 340 and may retrieve relevant population data from the population proxy server 350, and relevant mapping information from the mapping server 355 in order to accurately generate the geo-fence in accordance with the parameters received from the advertiser/content provider(s) 365. According to various embodiments, the geo-fence generating server(s) 345 may generate, maintain, and implement any number of geo-fences 110, simultaneously, for any number target locations 105. Each geo-fence maintained by the geo-fence generating server(s) 345 may have any desired shape, such as a circle, a polygon (or plurality thereof), a rectangle (or plurality thereof), etc. In one embodiment, the geo-fence generating server(s) 345 may generate the one or more geo-fences 110 based on inputs received from advertiser/content providers(s) 365 and 370 and data from the population proxy server(s) 350, and mapping server(s) 355, or any other publishers, advertisers, etc. The geo-fence generating server(s) 345 may, in combination with servers 340, 350 and 355, monitor the location of one more users' devices relative to perimeter/area information associated with each geo-fence to generate and maintain an updated list of the devices that enter and remain within each geo-fence.

The population proxy server 350 may include information regarding population density, census data, zip code information, electoral districts, department of motor vehicle locations, Wi-Fi hotspot data, and/or any other information, which may be used as a proxy for population. For example, the population proxy server 350 may associate each Wi-Fi hotspot, restaurant, shop, district, zip/region centroid, etc. with a certain population value and correlate this population value with a reach value.

The mapping server 355 may include information regarding addresses, borders, traffic patterns, road closures, event information, average traffic speed, etc. In addition, the system may be in communication with the electronic devices 310 via the network 305 and/or satellite(s) 360 to receive location, travel, and any other user information that may be used to generate the geo-fence in accordance with the content parameters. For illustrative purposes only, the server system 335 as shown in FIG. 3 is shown to include servers 340, 345, 350, and 355 in a unitary structure, however, it is understood that any or all of the servers 340, 345, 350, and 355 may be external to each other and owned and/or operated by different entities, as long as electronic communication may occur within one or more of the servers 340, 345, 350, and 355.

Figure 4:
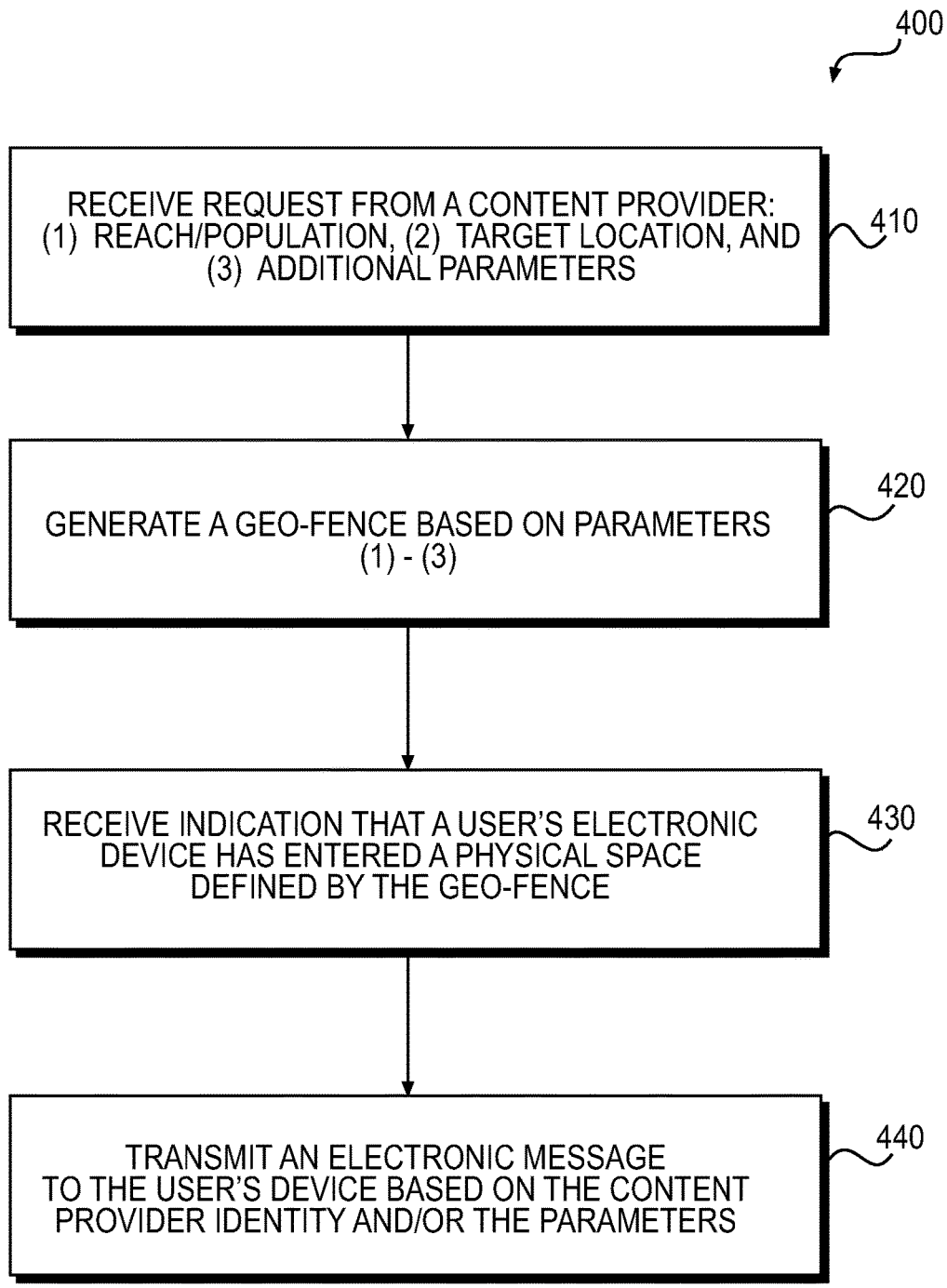
FIG. 4 is a flow diagram of methods for presenting electronic content to a user based on population based geographic zones, according to exemplary embodiments of the present disclosure.

FIG. 4 is a flow diagram of a method 400 for presenting electronic content to a user. The method 400 may include a step 410 of receiving, from an advertiser or content provider, a request identifying one or more parameters for displaying electronic content and/or advertisements to users. The advertiser/content providers 365 may be advertisers or other content publishers as discussed above. The parameters may be any suitable parameters such as, e.g., an identification of a reach or population value, physical location, a time and/or date range, and any other additional parameters, such as user demographics, promotions, etc. In one embodiment, the request may identify a reach value (e.g. 50,000 users), based on which a population value may be calculated. The content provider may implement a method, such as a calculation, a dynamic algorithm, various coefficients, or access a database, which may correlate population with an estimate of reach. For example, the reach server may access a population proxy server to obtain a population value correlated with estimated reach. As will be explained below, in examples in which the reach server 340 receives a reach value from the advertiser/content provider 365 in the request at step 410, the reach server 340 may itself calculate, instruct the geo-fence generating server 345 or any other server to calculate the population correlated with the reach value. This may be achieved, for example, by retrieving population data from the population proxy server 350. In another embodiment, the content provider may indicate a population value (e.g. 85,000 people) which the geo-fence should cover.

The physical location parameters may include a physical location (e.g., street address, highway exit, map coordinates, etc.) The physical location may be the physical location of an entity or business related to the electronic content and/or advertising or another location close to the entity relation to the online content (e.g., the closest highway exit to the entity, or the closest major intersection to the entity, etc.) or any other location. The user demographic information may include the type of age, gender, interests, income, category, etc.

A geo-fence may be generated at step 420 by a geo-fence generating server 345 or any other suitable entity. The dimensions and properties (e.g., shape, geometry, number) of the geo-fence(s) may be based on the parameters electronically received at step 410 by the reach server 340. For example, as described above with respect to FIG. 1, the geo-fence may be generated around a physical target location, and may extend in any suitable direction by a distance sufficient to include a population correlated with the reach value identified in the request received at step 410. The geo-fence generating server 345 may be in communication with other servers, such as the population proxy server 350 in order to retrieve population data for geographic areas around the target location. In addition, the geo-fence generating server 345 also may be in communication with the mapping server 355 to retrieve mapping information such as geographic borders (e.g. city, county, state, etc.), natural borders (e.g. mountains, rivers, lakes, etc.) for use in generating the geo-fence. The geo-fence generating server 345 may also electronically receive data from other servers for use in generating the geo-fence based on any other parameters identified in the request at step 410.

At step 430, one or more of the servers 335 may generate or receive an indication that a user's electronic device has entered a physical space defined by the geo-fence. For example, the geo-fence generating server 345 and/or mapping server(s) 355 may determine the location of a user's electronic device 110, via the network 305 and/or satellite(s) 355, relative to a stored perimeter and/or area associated with each of a plurality of known geo-fences. The user's electronic device 110 may be detected by accessing GPS data or any other suitable method (e.g., Wi-Fi triangulation, etc.) of detecting the location of the electronic device 110 within the geo-fence parameters. The indication may be an automatic electronic request sent by the geo-fence generating server 345 to the reach server 340 via the network. The indication may include any additional information about the user received via the user's electronic device 310, such as previous map searches, demographic information, etc. In addition, the indication may be generated and sent by the user device's operating system.

At step 440, the reach server 340 may automatically send electronic content and/or advertisements provided by the advertiser/content provider 365 via the network 305 to the user's electronic device 110 based on the parameters identified by the advertiser/content provider 365 at step 410. As described above, the electronic content and/or advertisements may include, by way of example, coupons, promotions, recommendations, product/service rankings, sponsored content, opinion content, advertisements, any of which may be embodied in any type or combination of text, graphics, animation, video, one- or two-dimensional barcodes, unique identifiers, and/or electronic messages (e-mail, SMS, etc.), mobile application notification, etc. As described above, the electronic content and/or advertising may be related to the products, services, or other business of the owner, operator, or affiliate of the target location associated with the respective geo-fence. For example, when a user's device 110 enters the physical space defined by a geo-fence requested or sponsored by a department store, the user may be presented with an advertisement or promotion for the user to purchase goods from the department store.

Figure 5:
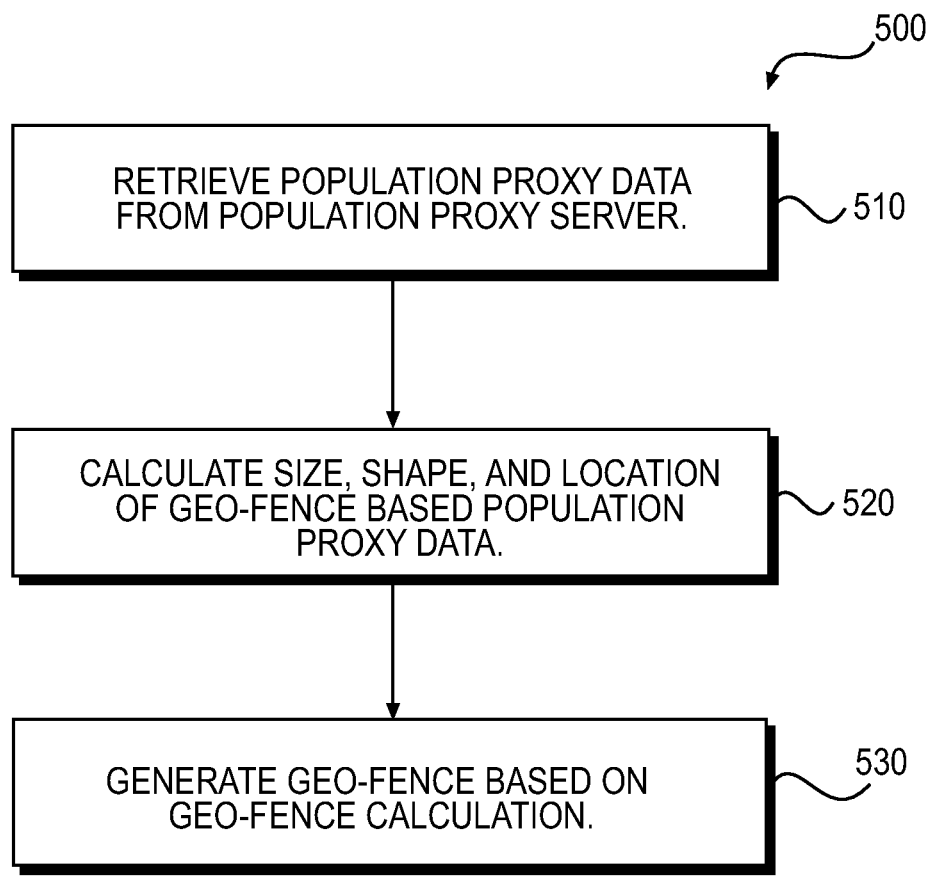
FIG. 5 is a flow diagram of methods for presenting electronic content to a user based on population based geographic zones, according to exemplary embodiments of the present disclosure.

FIG. 5 shows a flow diagram 500 of a method of generating a geo-fence, which may be used, for example, in step 420 of method 400. The method 500 may include a step 510 of retrieving population proxy data from the population proxy server 350 to correlate with the reach value or population value identified in the reach server request at step 410 of method 400. The reach value in the request received at step 410 may be correlated using any suitable algorithm or method to a population. The population of an area may be based on any populations data retrieved, for example, from census databases, or any suitable proxy for population or population density. Examples of population proxies may include zip code regions, each of which has a predetermined population value, zip code+four, which may identify a smaller predetermined population value than the zip code alone. Other suitable population proxies may include coffee shops, Wi-Fi hot spots, pharmacies, gas stations, DMV's, polling stations, or any other suitable proxies.

Based on the population proxy data retrieved at step 510, the geo-fence generating server 345 may calculate the various parameters of the geo-fence at step 520. The step 520 of calculating the various parameters of the geo-fence may be based on the parameters identified in the request at step 410 and the population proxy data retrieved at step 510, which may be processed by a processor of the geo-fence generating server 345. Examples of the geo-fence parameters may include the location, size, shape, and perimeter of the geo-fence.

At step 530, the geo-fence generation server 345 may generate the geo-fence based on the calculations at step 520 and mapping data retrieved from a mapping server 355, such as geographic borders, natural borders, etc., as discussed above.

Example

A pharmacy chain having physical locations nationwide may send a request to a reach server (e.g. 340) to present electronic coupons to users around each of its pharmacy locations. The reach server may access a population proxy server that accesses databases of an inventory of points representing the centers of United States Postal Service ZIP+4 areas, US Census Blocks or some other small representation of geography. The geographic density of these points may be inherently a function of population density; dense populations have dense Census Blocks and ZIP+four. This inventory of centerpoints (centroids) may be updated periodically to reflect trending population density. These inventory points may include a pair of coordinates (latitude and longitude) that may be used to geocode and enhance them with metadata that might include county name, distance to nearest highway exit, name of a community in which they are located, etc. The database also may include a spatial inventory of ZIP codes and US County polygons. The centroids may be overlaid with this spatial inventory enabling answers to questions such as, 'how many centroids are contained with this county?' The geo-fence generating server may analyze the distribution of centroids within each county/ZIP code polygon, and may determine a statistical assignment of density. For example, counties may be separated into groups of 'high density,' 'average density,' and 'low density.' Additional subgroupings also may be created. The geo-fences having the largest physical areas may be generated around those pharmacy locations in the lowest-density counties. This inverse relationship may be true for all geo-fences and densities. For this example, a one-mile radius may be applied to a pharmacy in a low-density county. In average-density counties, the radius may be smaller, such as a half mile. In high-density counties, the radius may be smaller still, such as a quarter mile. These radii, though varying in size, may have equivalent reach in terms of their application in presenting electronic content to users. The electronic content may then be presented to those users detected to be in the geo-fence based on the request.

FIG. 6 provides a functional block diagram illustration of computer hardware platforms consistent with any of the devices and servers described herein. FIG. 6 illustrates a network or host computer platform 600, as may typically be used to implement a server. It is believed that those skilled in the art are familiar with the structure, programming, and general operation of such computer equipment and as a result, the drawings should be self-explanatory.

A platform for a server or the like 600, for example, may include a data communication interface for packet data communication 660. The platform may also include a central processing unit (CPU) 620, in the form of one or more processors, for executing program instructions. The platform typically includes an internal communication bus 610, program storage, and data storage for various data files to be processed and/or communicated by the platform such as ROM 630 and RAM 640, although the server 600 often receives programming and data via network communications 670. The hardware elements, operating systems, and programming languages of such equipment are conventional in nature, and it is presumed that those skilled in the art are adequately familiar therewith. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the electronic device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method, comprising:
   transmitting, by a geofence generating device and to a content provider device, an electronic two-dimensional map,
      the content provider device being associated with a content provider,
      the electronic two-dimensional map including multiple population-based geographic zones,
      the electronic two-dimensional map including a user interface to input a reach value,
         the reach value being input into a specified input field via the user interface of the content provider device,
         the reach value being correlated to a population marker;
   receiving, by the geofence generating device, a request from the content provider device to transmit electronic content to a plurality of electronic devices of a targeted plurality of individuals,
      each individual, of the targeted plurality of individuals, being included in the targeted plurality of individuals based on a vehicle type of the individual,
      the request including:
         the reach value being associated with a quantity of individuals among the targeted plurality of individuals to receive the electronic content, and
         a rate of reaching one or more additional individuals among the targeted plurality of individuals within each specified period of time among a specified plurality of consecutive periods of time, and
      the electronic content relating to content associated with the content provider,
         the content provider being associated with a first target location and a second target location;
   retrieving, by the geofence generating device and from a population proxy server, a first population density data for the first target location and a surrounding area of the first target location, the first population density data comprising first inventory of centerpoints representing geographical centers of geographical areas within the surrounding area of the first target location;

retrieving, by the geofence generating device and from the population proxy server, a second population density data for the second target location and a surrounding area of the second target location, the second population density data comprising a second inventory of centerpoints representing geographical centers of geographical areas within the surrounding area of the second target location;

identifying, by the geofence generating device, a first geographical zone extending between the first target location and a first perimeter, the first geographical zone having a size or shape based on a population of the first geographical zone correlated with the reach value and the retrieved first population density data;

identifying, by the geofence generating device, a second geographical zone extending between the second target location and a second perimeter, the second geographical zone having a size or shaped based on a population of the second geographical zone correlated with the reach value and the retrieved second population density data, the first geographical zone being different in size than the second geographical zone, the reach value being equivalent in the first geographic zone and the second geographic zone, the first geographical zone and the second geographical zone being displayed on the user interface of the content provider device;

updating, by the geofence generating device, the size or shape of the first geographical zone based on updated first population density data, a time of day, and the rate of reaching one or more additional individuals among the targeted plurality of individuals within each specified period of time among the specified plurality of consecutive periods of time;

updating, by the geofence generating device, the size or shape of the second geographical zone based on updated second population density data, a time of day, and the rate of reaching one or more additional individuals among the targeted plurality of individuals within each specified period of time among the specified plurality of consecutive periods of time;

detecting, by the geofence generating device, an electronic device of one of the targeted plurality of individuals within the first geographical zone or the second geographical zone by use of electronic data provided by a satellite or a terrestrial computer network, the geofence generating device being configured to transmit information to a reach server indicating that the electronic device of one of the targeted plurality of individuals is within the first geographical zone or the second geographical zone, the reach server being configured to transmit electronic content to the electronic device of the one of the targeted plurality of individuals, and the electronic content relating to the first target location or the second target location; and maintaining, by the geofence generating device, an updated list of electronic devices that enter and remain within the first geographical zone or the second geographical zone.

2. The method of claim 1, wherein the first population density data and the second population density data are based on zip code information.

3. The method of claim 2, wherein the first population density data and the second population density data are based on zip code plus four geographical zone information.

4. The method of claim 1, wherein the first geographical zone and the second geographical zone are circular.

5. The method of claim 1, wherein the first geographical zone is a polygon and the second geographical zone is a polygon.

6. The method of claim 1, wherein the request further comprises a parameter based on a date.

7. The method of claim 1, further comprising:
adjusting the first geographical zone and the second geographical zone based on an additional parameter.

8. The method of claim 7, wherein the additional parameter is at least one of:
date,
time, or
traffic data.

9. The method of claim 1, wherein generating the first geographical zone and the second geographical zone comprises:
adjusting the first geographical zone and the second geographical zone based on geographic data.

10. The method of claim 9, wherein the geographic data is at least one of:
natural boundaries,
highway accessibility, or
geographic borders.

11. A system, comprising:
a data storage device storing instructions for managing an electronic distribution of electronic content to electronic device users; and
one or more processors to:
transmit, to a content provider device, an electronic two-dimensional map,
the content provider device being associated with a content provider,
the electronic two-dimensional map including multiple population-based geographic zones,
the electronic two-dimensional map including a user interface to input a reach value,
the reach value being input into a specified input field by the content provider via the user interface of the content provider device,
the reach value being correlated to a population marker;
receive, from the content provider device, a request to transmit electronic content to a plurality of electronic devices of a targeted plurality of individuals,
each individual, of the targeted plurality of individuals, being included in the targeted plurality of individuals based on a vehicle type of the individual,
the request including:
a reach value being associated with a quantity of individuals among the targeted plurality of individuals receiving the electronic content, and
a rate of reaching one or more additional individuals among the targeted plurality of individuals within each specified period of time among a specified plurality of consecutive periods of time, and
the electronic content relating to content associated with the content provider, the content provider being associated with a first target location and a second target location;

retrieve, from a population proxy server, first population density data for the first target location and a surrounding area of the first target location,
    the first population density data comprising a first inventory of centerpoints representing geographical centers of geographical areas within the surrounding area of the first target location;

retrieve, from the population proxy server, second population density data for the second target location and a surrounding area of the second target location,
    the second population density data comprising a second inventory of centerpoints representing geographical centers of geographical areas within the surrounding area of the second target location;

identify a first geographical zone extending between the first target location and a first perimeter,
    the first geographical zone having a size or shape based on a population of the first geographical zone correlated with the reach value and the retrieved first population density data;

identify a second geographical zone extending between the second target location and a second perimeter,
    the second geographical zone having a size or shape based on a population of the second geographical zone correlated with the reach value and the retrieved second population density data,
    the first geographical zone being different in size than the second geographical zone, the reach value being equivalent in the first geographic zone and the second geographic zone,
        the first geographical zone and the second geographical zone being displayed on the user interface of the content provider device;

update the size or shape of the first geographical zone based on updated first population density data, a time of day, and the rate of reaching one or more additional individuals among the targeted plurality of individuals within each specified period of time among the specified plurality of consecutive periods of time;

update the size or shape of the second geographical zone based on updated second population density data, a time of day, and the rate of reaching one or more additional individuals among the targeted plurality of individuals within each specified period of time among the specified plurality of consecutive periods of time;

detect an electronic device of one of the targeted plurality of individuals within the first geographical zone or second geographical zone by use of electronic data provided by a satellite or a terrestrial computer network, transmit information to a reach server indicating that the electronic device of one of the targeted plurality of individuals is within the first geographical zone or the second geographical zone,
    the reach server being configured to transmit electronic content to the electronic device of the one of the targeted plurality of individuals,
    the electronic content relating to the first target location or the second target location; and maintain an updated list of electronic devices that enter and remain within the first geographical zone or the second geographical zone.

12. The system of claim 11, wherein the one or more processors are further to:
    adjust the first geographical zone and second geographical zone based on an additional parameter.

13. The system of claim 12, wherein the additional parameter is at least one of:
    date,
    time, or
    traffic data.

14. The system of claim 12, wherein the first population density data and second population density data are based on zip code plus four geographical zone information.

15. The system of claim 11, wherein the one or more processors, when identifying the first geographical zone, are to:
    adjust the first geographical zone based on geographic data.

16. The system of claim 15, wherein the geographic data is at least one of:
    natural boundaries,
    highway accessibility, or
    geographic borders.

17. The system of claim 11, wherein the first population density data and second population density data are based on zip code information.

18. A non-transitory computer-readable medium storing instructions, the instructions comprising:
    one or more instructions that, when executed by one or more processors of a device, cause the one or more processors to:
    transmit, to a content provider device, an electronic two-dimensional map,
        the content provider device being associated with a content provider,
        the electronic two-dimensional map including multiple population-based geographic zones,
        the electronic two-dimensional map including a user interface to input a reach value,
            the reach value being input into a specified input field by the content provider via the user interface of the content provider device,
            the reach value being correlated to a population marker;
    receive, from the content provider device, a request to transmit electronic content to a plurality of electronic devices of a targeted plurality of individuals,
        each individual, of the targeted plurality of individuals, being included in the targeted plurality of individuals based on a vehicle type of the individual, and
        the request including:
            a reach value being associated with a quantity of individuals among the targeted plurality of individuals receiving the electronic content, and
            a rate of reaching one or more additional individuals among the targeted plurality of individuals within each specified period of time among a specified plurality of consecutive periods of time, and
            the electronic content relating to content associated with the content provider,
            the content provider being associated with a first target location and a second target location;
    retrieve, from a population proxy server, first population density data for the first target location and a surrounding area of the first target location,
        the first population density data comprising a first inventory of centerpoints representing geographical centers of geographical areas within the surrounding area of the first target location;

retrieve, from the population proxy server, second population density data for the second target location and a surrounding area of the second target location, the second population density data comprising a second inventory of centerpoints representing geographical centers of geographical areas within the surrounding area of the second target location;

identify a first geographical zone extending between the first target location and a perimeter,
- the first geographical zone having a size or shape based on a population of the first geographical zone correlated with the reach value and the retrieved first population density data;

identify a second geographical zone extending between the second target location and a second perimeter,
- the second geographical zone having a size or shape based on a population of the second geographical zone correlated with the reach value and the retrieved second population density data,
- the first geographical zone being different in size than the second geographical zone,
- the reach value being equivalent in the first geographic zone and the second geographic zone, and
- the first geographical zone and the second geographical zone being displayed on the user interface of the content provider device;

update the size or shape of the first geographical zone based on updated first population density data, a time of day, and the rate of reaching one or more additional individuals among the targeted plurality of individuals within each specified period of time among the specified plurality of consecutive periods of time;

update the size or shape of the second geographical zone based on updated second population density data, a time of day, and the rate of reaching one or more additional individuals among the targeted plurality of individuals within each specified period of time among the specified plurality of consecutive periods of time;

detect an electronic device of one of the targeted plurality of individuals within the first geographical zone or the second geographical zone by use of electronic data provided by a satellite or a terrestrial computer network;

transmit information to a reach server indicating that the electronic device of one of the targeted plurality of individuals is within the first geographical zone or the second geographical zone,
- the reach server being configured to transmit electronic content to the electronic device of the one of the targeted plurality of individuals,
- the electronic content relating to the first target location or the second target location; and maintain an updated list of electronic devices that enter and remain within the first geographical zone or the second geographical zone.

19. The non-transitory computer-readable medium of claim 18, wherein the first population density data and the second population density data are based on zip code information.

20. The non-transitory computer-readable medium of claim 18, wherein the first population density data and second population density data are based on zip code plus four geographical zone information.

21. The non-transitory computer-readable medium of claim 18, wherein the first geographical zone is a polygon and the second geographical zone is a polygon.

* * * * *